J. W. TROTTER.
MANUFACTURE OF GASOLENE.
APPLICATION FILED NOV. 14, 1918.
1,339,727.
Patented May 11, 1920.
2 SHEETS—SHEET 1.
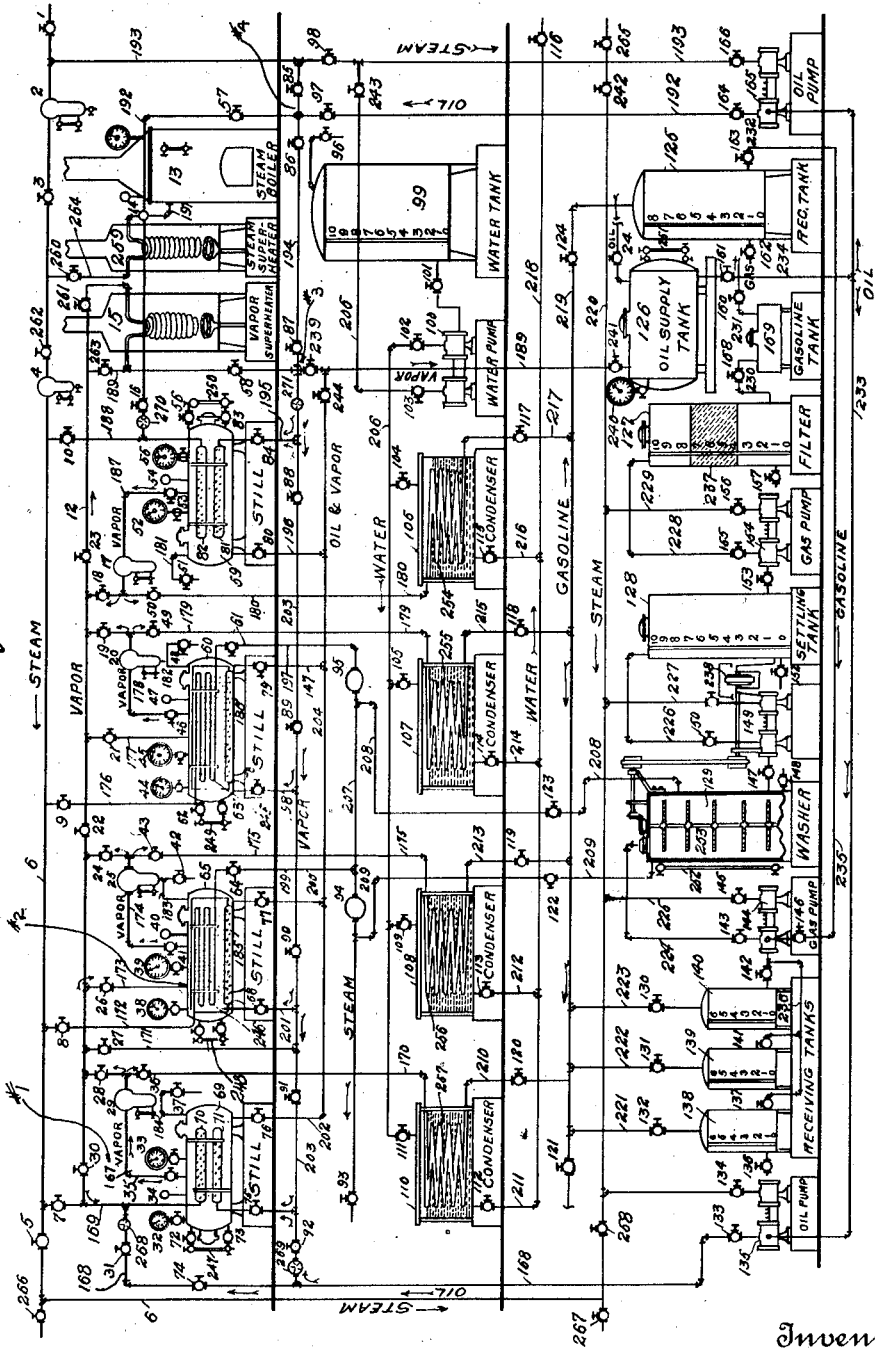
Inventor
Joseph Wilson Trotter
By
Attorney J. W. TROTTER.
MANUFACTURE OF GASOLENE.
APPLICATION FILED NOV. 14, 1918.
1,339,727.
Patented May 11, 1920.
2 SHEETS—SHEET 2.
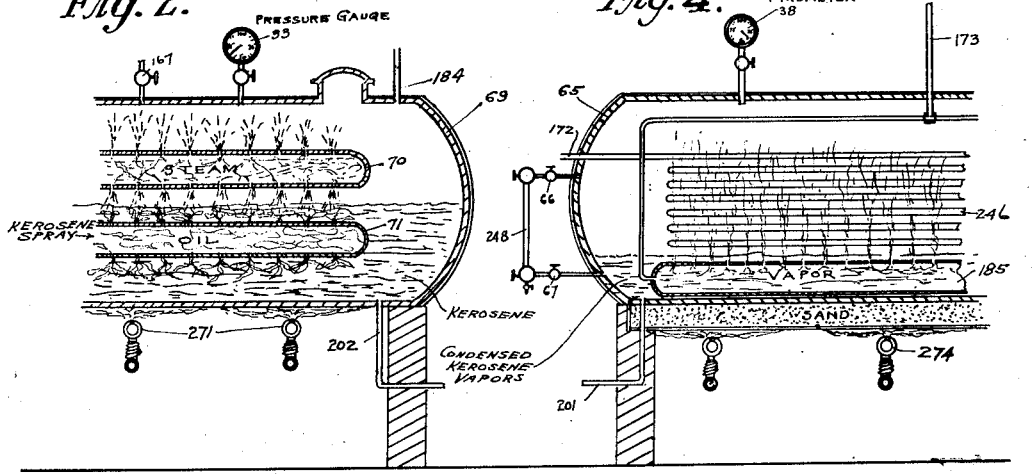
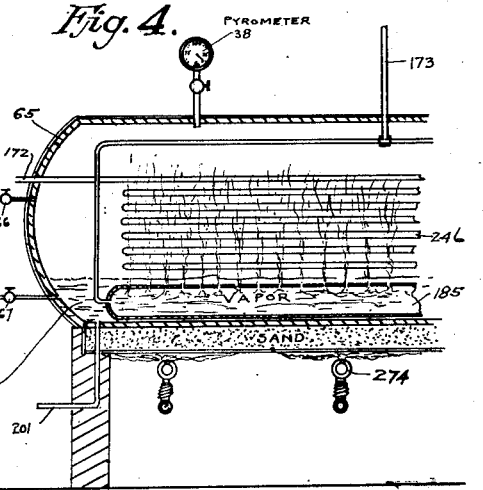
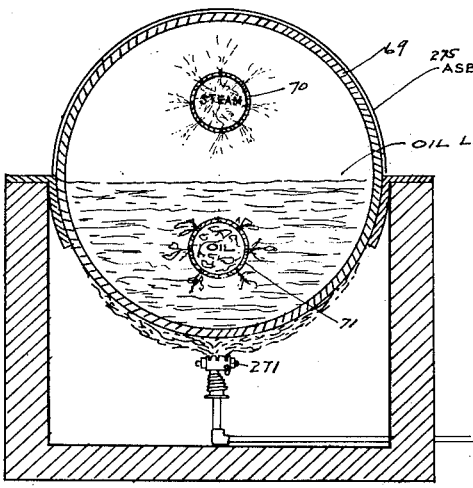
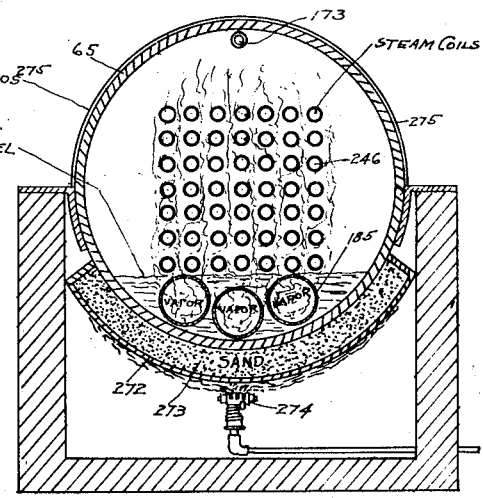
Inventor
JOSEPH WILSON TROTTER

UNITED STATES PATENT OFFICE.

JOSEPH WILSON TROTTER, OF BIRMINGHAM, ALABAMA.

MANUFACTURE OF GASOLENE.

1,339,727.    Specification of Letters Patent.    Patented May 11, 1920.

Application filed November 14, 1918. Serial No. 262,563.

*To all whom it may concern:*

Be it known that I, JOSEPH WILSON TROTTER, a citizen of the United States of America, residing at Birmingham, in the county of Jefferson and State of Alabama, have invented certain new and useful Improvements in the Manufacture of Gasolene, of which the following is a specification.

My invention relates to a process for the production of gasolene from kerosene oil, naphtha and other partially refined oils of the paraffin series having a higher specific gravity than kerosene, and the object of my invention is to treat these oils so as to effect practically a complete conversion thereof into commercial gasolene having a lower boiling point than the original oil.

The object of the invention is to provide new and useful improvements in the manufacture of gasolene whereby kerosene oil is converted into gasolene, serviceable for use in safety lamps, used in coal mines and in street torches, and illuminating purposes when burned in mantles, and hence is well adapted for use as a motive agent in internal combustion engines.

My process involves as a preliminary step the refinement of the oil by treatment with fuming sulfuric acid, and this refined oil is then subjected to superheated gasolene vapors of a very high temperature to induce a boiling of the oil which will result in increasing its specific gravity prior to its decomposition in the "cracking" still. After treatment with the superheated gasolene vapors the oil is sprayed into an initial "cracking" still through submerged sprays of a catalytic character under a pressure of 75 to 100 pounds and at a temperature of from 500° F. to 700° F., and the vapors produced in this still are drawn off until the residuum falls below 58° Bé., thereupon this residuum is subjected to the action of superheated gasolene vapors and superheated steam to complete its decomposition into a gas vapor which can be condensed into gasolene. The water will be separated from the gasolene in the settling tank.

My invention contemplates a further refinement of the evolved vapors by their treatment in successive "cracking" stills in which the pressure is successively reduced and the temperature successively increased. In the treatment of the light hydro-carbon oils it is important that as the volatility increases the pressure should be reduced but the temperature increased to completely decompose the oil and any residuum thereof.

My invention further contemplates a process in which the production of gasolene may be continuously carried on by the provision of a plurality of initial treatment "cracking" stills so interconnected with the superheaters for the gasolene vapors and steam and with the stills for the final refinement of the products that various gravities of gasolene may be simultaneously produced and stored for the final washing and purifying steps customary in this art.

In the accompanying drawings I have illustrated an apparatus suitable for carrying my invention into effect.

Figure 1 is a diagrammatic view illustrating the complete apparatus and its piping connections.

Figs. 2 and 3 are longitudinal and transverse sectional views of the initial cracking still.

Figs. 4 and 5 are similar views of one of the stills for the further refining of the vapor produced in the initial cracking still.

Similar reference numerals refer to similar parts throughout the drawings.

In this apparatus the treatment is carried out as follows:

The original material, such as kerosene, is first treated in the well known manner with fuming sulfuric acid, then the purified material is delivered through valve 24 at a normal temperature, say 60° F. to 70° F. into tank 126 until it is half full, wherein it is quickly heated to boiling, say 200° F. by the admission of superheated gasolene vapors having a temperature of from 1100° F. to 1200° F. from the superheater 15 having a coil preferably of nickel and a suitable heater, said vapor being delivered through pipe 189 and past valves 58, 239 and 241. Superheated gasolene vapor is mixed with the original material or kerosene. The resulting reaction increases the Bé. gravity of the oil in tank 126 prior to decomposition or "cracking." After being thus treated the oil is passed through pipe 234 by valve 161 to pump 165 and is forced thereby through pipe 192 past valves 164, 97, 57, and 16 into the top spray 82 of the initial "cracking" still 59. I may alternatively pass the oil by pipe 194 past valves 86, 87 and 84 through pipe 195 into the lower spray 81 in the "cracking" still 59. In this "cracking" still, which is subjected to heat in the manner well understood in this art, the sprays are preferably provided only with lateral discharge openings so that the oil is sprayed in a fine spray into the still in which a temperature of from 500° F. to 700° F. is maintained. The sprays 81 and 82 are preferably of copper material and become submerged in a bath of the oil thus producing a catalytic action in the still. The spraying of the oil in the manner described in the "cracking" still 59 produces a uniform distribution thereof through the more highly heated oil first introduced into the still which is under a pressure of from 75 to 100 pounds, according to the characteristics of the oil. This pressure is regulated by the throttle valve 53 controlling the outlet of vapor. This "cracking" process will be found to convert a large percentage of the oil into a vapor which will condense into commercial gasolene. When the oil in the "cracking" still 59 falls below a gravity of 58 Bé. superheated gasolene vapors from superheater 15 are conducted through pipes 189 and 195 past valves 58 and 84 into the lower spray 81 and steam at a pressure of approximately 250 pounds from superheater 259 is admitted through pipes 264, 6 and 188 past valves 260, 262, steam separator 4 and valve 10 into the spray 82 and these agencies react on the residue in the "cracking" still further decomposing it until it is brought up to the desired specific gravity and the whole oil is thus converted into vapors which will condense into commercial gasolene. The vapors as generated in the "cracking" still 59 are conducted through pipes 187 and 180 past valve 53, oil and vapor separator 17, and valve 50 to the condenser 106 being passed through a cooling coil 254 therein and are delivered through pipe 217 past valve 117 to any one of the receiving tanks 125, 138, 139 or 140 as desired, its distribution being controlled by the valves 124, 130, 131 and 132, the latter being in the pipes 221, 222 and 223. If it is desired to further refine the vapors as produced in the "cracking" still 59 to obtain higher Bé. gravities the vapors instead of being passed to the condenser 106 are conducted from said "cracking" still by two courses into the "cracking" still 60; in one course the vapors passing by valve 18 and pipe 12 into pipe 177 and past valve 21 into the top of still 60; and the other course, the vapors passing by valve 23 and pipe 12 to pipe 189, past valves 263, 58, 88 and 89 to pipe 198 and past valve 78 into the bottom of still 60. The vapors as conducted through pipes 177 or 198 are delivered to a spray pipe 186 lying on the bottom of the still 60 having top perforations which spray the vapors upwardly over the steam heated coils 245 which are plated preferably with nickel to produce a catalytic action for further "cracking" the vapors, which after this treatment are carried off past valve 46 and through the oil and vapor separator 20 and valve 49 to pipe 179 leading to the condenser 107 whence the further refined gasolene may be conducted to the manifold distributing pipe 219 and delivered to the desired tank. The pressure conditions which should preferably be maintained in the secondary "cracking" still 60 are lower than in the initial "cracking" still 59, being preferably maintained by the throttling action of valve 46 between 50 and 60 pounds, and the temperature is raised to from 800° F. to 850° F., according to the volatility of the constituent by regulating at valve 9 the flow of steam from the boiler 13 through steam superheater 259 past valve 260 to pipe 6 and past valve 262 to pipe 176, and also by regulation of the furnace under the still, which latter preferably is surrounded by a sand bath to insure a high temperature which is substantially uniform about the entire still.

If it is desired to still further refine the vapors as generated in the secondary "cracking" still 60, they are conducted by two courses to the final "cracking" still 65, one course being past valves 19, 22 and 26 through pipe 173 through the top of the still 65 into the spray 185, and the other course being past valve 27 through pipes 171 and 201 past valve 68 through the bottom of still 65 into the spray 185. This still 65 is structurally similar to still 60 except that in this the pressure conditions are maintained by the throttle valve 41 between 40 and 50 pounds, while the temperature is increased by the steam and furnace control already described to from 900° F. to 950° F., according to the volatility of the vapor. From the final "cracking" still 65 the vapors are carried off through pipe 174 past the oil and vapor separator 25 to pipe 175 and past valve 43 to condenser 108 and thence the condensed vapors are conducted through pipe 213 past valve 119 to the manifold distributing pipe 219. To insure a continuous operation for my apparatus and maximum capacity as well as variety of gravities of product, I provide a pump 135 which will force oil conducted from the tank 126 by pipe 233, to an initial "cracking" still 69 similar in construction and operation to the still 59, the oil flowing through pipe 168 past valves 133, 74, 31 and 92 to pipes 203 and 169 leading respectively to the sprays 70 and 71 corresponding to 82 and 81. Pipe 169 is connected to the steam pipe 6, under control of valve 7, and to the pipe 12 under control of valve 30. Pipe 203 is connected to pipe 194 and through it to pipes 195, 198 and 201 entering the bottoms of stills 59, 60 and 65, respectively. The pipe 12, by connection with the pipes 173, 177 and 188, enters the upper portion of the stills 65, 60 and 59, respectively, in the manner already described. In addition thereto, the pipe 12, by means of pipe 171 and valve 27, is cross connected to the pipes 203 and 194, thus enabling vapor to be transferred through this cross connection and delivered either to the top or bottom of the stills as desired from one of the other stills or from superheater 15, and in like manner the superheated steam may flow through pipes 194, 203 and 171 to pipe 12 and be delivered into the upper portions of any one of the stills. The pumps 165 and 135 are each capable of independently conducting the oil from tank 126 to either initial still 59 or 69, thus enabling either pump to supply either or both initial stills and to deliver the constituent to the top or bottom spray therein as desired.

My object in providing two sprays 81 and 82 in still 59, and 70 and 71 in still 69 is to enable me to discharge the vapors only through the lower submerged spray while the superheated steam may be discharged through the upper spray which is not submerged, it being always desirable that the vapors should be discharged below the surface level of the oil. As the vapor rises from the oil it is attacked by the jets of superheated steam and is further "cracked" or decomposed. The combined action of the highly superheated vapors sprayed into the oil collecting in the still and the superheated dry steam above the oil act jointly to effectually decompose it and convert it into vapors condensable into commercial gasolene. When it is my desire to run the initial cracking still 59 hot the charge is allowed to run below 58 Bé., then the oil in tank 126 is treated with superheated gasolene vapor until it reaches a boiling point, after which the hot vapors are turned off and the temperature of the oil allowed to drop to approximately 80° Far. before it is pumped into the cracking still through a catalytic spray beneath a bath of oil, and to finish I add water in the form of superheated steam to about twenty-five per cent. in volume to that of the vapor in the still, the volume of steam being measured by any suitable appliance, and the gage, indicating the height of the oil level in the still, will enable the volume of gas therein to be determined. The treatment of the residue with the superheated steam and its decomposition by the high temperatures maintained enables all this residue to be converted into gasolene. It is however to be understood that the temperatures and pressures and proportions, both of steam and gasolene vapor, will vary according to the gravity of the kerosene oil used, and the volatility of the vapor used in carrying out my methods. The water condensed in the vapor when separated is drawn out of the settling tank 128 through valve 152.

Briefly summarized, my process involves the following more important steps:

1. My process comprises producing gasolene resulting from the decomposition of kerosene oil by the application of heat and pressure in the presence of a suitable catalytic.

2. Passing vapor thereby produced through a perforated mechanical device and spraying said vapor over a suitable catalytic steam heated surface at a pressure sufficient to produce the desired results.

3. The gas vapor is subjected to subsequent treatments of increased temperature and at a lower pressure and is sprayed through the device with smaller perforations than the prior mechanical device.

4. The purpose accomplished by spraying said vapor over the steam heated surface, is that it expedites the heat treatment of said vapor as it comes in contact with the hot surface.

5. The treatment of a residuum in the initial "cracking" still by lateral sprays of superheated gas vapors and divergent sprays of superheated steam to completely decompose the residuum of the constituent so that it can be distilled off, leaving the bottom of the still dry.

The new product thereby produced has a crystal brightness and has a lower boiling point than the original "kerosene oil", and is produced in one continuous run and utilizes the entire original elements.

My arrangement of "cracking" stills affords a very flexible control of treatment in that the two initial "cracking" stills 59 and 69 are capable of simultaneous and independent operation and the vapors therein produced can be separately and simultaneously treated in the stills 60 and 65 serving as secondary "cracking" stills. By closing valve 22 and reducing the pressure and temperature in still 65 to that described for still 60 a simultaneous treatment can go forward initially in stills 59 and 69 with a further refinement of the vapors from still 59 in still 60, and a like further refinement of the vapors from the still 69 in the still 65, and if a further refinement is needed of the vapors given off from either still 60 or 65 the other of said stills may be cut out of circuit with its respective initial still and its pressure and temperature conditions adjusted and a final treatment given to said vapors therein in the manner already described.

After the gasolene as thus produced has been collected in the tanks 125, 138, 139 and 140, each tank may be separately drained by action of the pump 144 and its contents delivered into the top of the washing tank 129 where it is treated in any well known manner, preferably with caustic soda, that is introduced through a manhole opening in the top of the tank, and with exhaust steam introduced through pipes 208 and 209, being agitated while in the tank by the rotating stirrer blades 253 driven by any suitable mechanism. The washed gasolene is drawn off through pipe 147 and is forced bump 149 through 226 into the settling tank 128 where it is allowed to settle, the matter precipitated being drawn off by valve 152 in the bottom of the settling tank while the gasolene is drawn off the pipe 153 and is forced by pump 154 through pipe 228 into the filtering tank 227 where it is filtered through a bed of fullers' earth or the like and is drawn off from the bottom of the filtering tank into the pure gasolene tank 159 and thence is drawn off through pipe 231 past valve 160 to the point of use.

The residue is drawn out from the tanks 69, 65, 60, 59 and 126 for the purpose of ascertaining its gravity through the bottom valves of the respective gage glasses 247, 248, 249, 250 and 251.

The valves 37, 42, 48 and 51, respectively, in the pipes 184, 183, 182, and 181 permit the escape of atmospheric pressure out of their respective stills when the latter are being charged in the manner already described and these valves also provide a means whereby the operator can draw out the vapor from time to time for testing purposes in order that accurate production in quality of gasolene may be maintained by the regulation of the throttle valves 35, 41, 46 and 53.

Exhaust steam traps 94 and 95 on the exhaust steam lines 199 and 197, respectively, are adapted to regulate the pressure carried in the heating coils 246 and 245, respectively. The water of condensation from these traps can be conducted through pipes 208 and 209 past valves 123 and 122 to the washing tank 129, or carried through pipe 207 past valve 93.

The cooling water for the condensers is pumped from tank 99 by pump 100 and conducted through pipe 206 past valves 102, 104, 105, 109 and 111 to the desired condenser, being conducted therethrough past valves 112, 113, 114 and 115 to the manifold 218 and past valve 116 to the waste.

The stills are preferably fired from the sides to produce a more uniform distribution of heat thereto. The perforated sprays 185 and 186 are preferably of nickel to produce catalytic action. The valves 117, 118, 119 and 120 are throttling valves which are set to maintain the desired pressure in their respective condensing coils.

In order to prevent back pressure interfering with the operation of pumps 135 and 165, I interpose check valves 268 and 269 in the feed line 168, a check valve 270 in the feed line 192 and a check valve 271 in the feed valve 194.

The quality and quantity of the gasolene produced is directly affected by the velocity of flow of vapor in passing over the heated surfaces 245 and 246. As designed to maintain an average production of 3000 imperial gallons per hour of 64 Bé. to 66 Bé. gravity gasolene out of kerosene or equivalent oil of from 45 to 49 Bé. using both initial stills 59 and 69, such stills are given a length of 40 ft. and a diameter of 10 ft., being constructed of steel suitable to withstand a hydrostatic pressure of not less than 150 pounds per square inch and having a top vapor outlet 12 inches in diameter. The secondary "cracking" stills 60 and 65 are of the same diameter but five feet greater in length to accommodate the further expansion of the vapor due to the higher temperature conditions normally prevailing therein and these stills are designed to withstand the same hydrostatic pressure as the initial stills. The supply tank will be 34 feet in length and 12 feet in diameter. Pipes 174, 167, 178 and 187 are 12 inches in diameter, pipes 173 and 174 are 8 inches in diameter, and pipes 185 and 186 are 4 inches in diameter. The heating coil pipes 245 and 246 are 1-1/2 inches in diameter and 38 feet long. The spray pipes 70, 71, 81 and 82 are 6 inches in diameter, 38 feet long and formed of copper pipe with spray perforations 1/32nd of an inch on quarter inch centers. The spray pipes 185 and 186 are of copper, 6 inches in diameter, 38 feet long with perforations 1/64th of an inch in diameter spaced on quarter inch centers. Under the stills 69 and 59 the burners 271 are spaced at suitable intervals and direct their flames against the bottom and sides of the stills with a direct application of the heat. In stills 60 and 65 a sand jacket 272 supports a cover or bath of sand 273 under the lower portion of the stills which is covered by the residue, and the burners 274 in this instant direct their flames so as to impinge against the jackets and the heat is radiated through the sand bath and uniformly distributed over the bottom of the still. All stills are preferably covered overhead with an asbestos lining 275. The sand bath is so arranged as to protect the walls of the stills with which the gasolene or vapors contact from becoming overheated.

The first chemical treatment of the kerosene is to subject it to fuming sulfuric 2-1/4 per cent. in volume for oil of 45 Bé. and 2 per cent. for oil of 49 Bé. at a temperature of 125° Far., after which the acid and the said oil are separated and the oil washed with water at a temperature of 212°

Far., then allowed to separate and cool down to 80° Far., then is subjected in tank 126 to 25 per cent. in volume of gasolene vapor at a temperature of 1100° Far. to decompose the smoky and oily element. It is allowed then to cool down to 80° Far. and is forced into a bath of the oil in a cracking still 59 or 69 and is heated therein to a temperature of 700° Far. and is subjected to a pressure of 100 lbs. to the square inch.

The low boiling point product produced in the first distillation of my process practised in still 59 or 69 is then passed through still 60 or 65 with its accessories as shown and described at a temperature of 950° and a pressure of 60 lbs. to the square inch, producing a yield of 98 per cent. gasolene, leaving 2 per cent. residue, 58 Bé. This residue in the still 60 or 65 may be further treated therein or conducted therefrom through the various pipe connections shown to any desired part of the apparatus for further treatment therein.

The treatment of the oil in still 59 or 69 is normally conducted without the use of gasolene vapor or superheated steam and will normally convert 90 per cent. of the original charge of kerosene oil 45 Bé. into gasolene 60 Bé., leaving 10 per cent. of the original charge as a residue in the still. In converting this residue into gasolene without removing it from the still, I introduce gasolene vapor 64 Bé. in volume equal to 200 per cent. of the residue at a temperature of 1000° Far. through the catalytic spray 71 or 81 which is submerged in the bath, the velocity of flow of said vapor being regulated so as to produce a 60 Bé. gasolene until 80 per cent. of the said residue has been converted into gasolene. The remaining 20 per cent. of said residue is then subjected to a treatment of 25 per cent. of its volume of superheated steam through the upper spray 70 or 82 at a temperature of 1100° Far., but before running the still hot the gasolene spray is discontinued, the temperature in the furnace being reduced and the volume of steam increased. The remaining 20 per cent. residue is decomposed by the temperature from the furnace and by the application of the sprays of superheated steam until all of the 20 per cent. residue has been converted into gasolene.

In the practice of my process, the kerosene oil is forced into the still 69 to about one-half its retaining capacity, then the furnace is fired and the temperature raised in still to 700° Far., which is easily ascertained by the pyrometer. When the pressure has reached the 100 lbs., which can be determined by the pressure gage, the throttle valve is set to allow the vapor produced to escape in proportion to the quantity of said vapor being generated so as to maintain the required pressure on the oil and vapor. The temperature will not have reached the 700 mark until about 35 per cent. of the original charge has been converted into gasolene.

The reason for increasing temperature in stills 60 and 65, as compared with stills 59 and 69, is that steam heat and heat applied through said sand bath is much slower in distillation and is of a different nature from the heat applied directly from the furnace on the bare surface of the bottom of the stills 59 and 69. This step is of vital importance to the conversion of all the material into a superior article of gasolene.

With a uniform temperature of 700° Far. and a pressure of 100 lbs. to the square inch with a still equipped as shown with all its accessories as described, the gravity of kerosene oil is increased from 45 Bé. to 60 Bé. and 100 per cent. of the original charge is converted into gasolene in my first operation. In my second operation with a uniform temperature of 950° Far. and a pressure of 75 lbs. to the square inch in still 65 with its accessories internal and external as shown, produces an increase in gravity from 60 Bé. to 64 Bé. converting 100 per cent. of the original charge into gasolene. In my third operation with a uniform temperature of 1000° Far. and a pressure of 65 lbs. to the square inch in still 60 with its accessories internal and external as described, will increase the gravity from 64 Bé. to 68 Bé. gasolene, utilizing or converting 100 per cent. of the original charge. Reversing the apparatus by adjusting the valves and all the parts that are to be considered in its operation as herein explained produces the same yield as beginning with still 69 as herein explained.

The arrangement of the stills in my apparatus is shown to be tandem which is not necessary to the sucess of their operation. They may be placed side by side any suitable distance apart consistent with economy and safety in operation. It is imperative that all connections, joints and valve stems be securely packed and well screwed up in order to keep the gas vapor from escaping while in operation as the stills are supposed to be housed or covered so as to prevent condensation from the temperature of the atmosphere. Under such operating conditions I find that the resulting velocity flow of vapor generated in the initial stills will, in passing through the stills 60 or 65, produce the best quality of gasolene under the conditions already described as to temperature and pressure in said latter stills and in their respective heating coils.

In practice, I thus succeed in converting all of the original charge of kerosene oil or like material which is delivered into either initial "cracking" stills 59 or 69 into a product having a lower boiling point than the original oil and which I have herein referred to as gasolene. This conversion takes place before the oil in the form of gas vapor is delivered into either or both of the stills 60 and 65. It will be expressly understood by those trained in the art of refining oil that the product herein referred to as gasolene is "cracked" gasolene prepared by the decomposition in accordance with scientific and practical methods of treating kerosene, naphtha or other like partially refined hydro-carbon oils of the paraffin series, and that I accomplish this refinement without the employment of any other ingredients except such as are produced from the original material in the manner and with the apparatus as described, whereby I am enabled to convert all of the original constituent into commercial gasolene without leaving any residue.

What I claim as new and desire to secure by Letters Patent, is:—

1. The herein described process for converting a partially refined light hydrocarbon oil into gasolene, which consists in spraying the oil through a submerged catalytic spray into a bath of oil under a pressure of not less than 75 pounds and in the presence of "cracking" heat and superheated steam.

2. The herein described method for the refinement of kerosene and like light oil of the paraffin series, which consists in treating the oil with superheated gasolene vapors until it is brought to the boiling point, then forcing the oil under pressure into a cracking still through a perforated catalytic agent submerged in a bath of the oil under pressure of from 75 to 100 pounds and at a temperature from 500° F. to 700° F., subjecting the oil under treatment to superheated steam and condensing the resulting vapors.

3. The herein described process for treating the resultant vapors produced by "cracking" kerosene and like light hydro-carbon oils, which consists in spraying the vapors over a steep heated catalytic surface through a perforated spray in a finishing still having a temperature in excess of the end point of said oil, and then passing the vapors over a second catalytic steam heated surface in a final finishing still having a higher temperature than the first mentioned still and in the presence of a "cracking" heat and superheated steam and under a reduced pressure, and then condensing said vapor.

4. The herein described process for converting kerosene and like hydro-carbon oils into gasolene, which consists in subjecting the oil to heated vapors to bring it above its boiling point, decomposing the oil in a "cracking" still in the presence of superheated steam, drawing off the vapors from said still until the residue therein falls below 58 Bé., and then subjecting said residue to the decomposing action of superheated steam and superheated gasolene vapors until almost completely decomposed, and finishing the complete decomposition of the residue by a "cracking" heat in the still under 75 lbs. pressure and in the presence of superheated steam.

5. The method of converting kerosene and like light hydrocarbon oils into commercial gasolene, which consists in subjecting the oil in a cracking still to a temperature from 500° F. to 700° F. and to a pressure of not less than 75 pounds, then passing the vapors thereby produced to a second still and spraying them over a steam heated catalytic surface therein at a temperature of from 800° F. to 850° F. and at a pressure around 50 pounds, and finally passing the vapors thereby produced to a third still and spraying them over a steam heated catalytic surface therein at a temperature of from 900° F. to 1100° F. and at a pressure of approximately 40 pounds, subjecting the oil in each still to the action of superheated steam, and finally condensing the said vapors.

6. The herein described process for the production of commercial gasolene from kerosene and like light hydro-carbon oils, which consists in subjecting the oil preparatory to "cracking" treatment to the action of superheated vapors, providing a plurality of initial "cracking" stills in which the prepared oil is sprayed into a bath of oil having a higher temperature and in the presence of superheated steam and under a pressure of not less than 75 pounds, and passing the vapors resulting from the decomposition of the oil in the initial "cracking" stills through other "cracking" stills having a relatively higher temperature and a lower pressure than the initial stills and in the presence of superheated steam and a catalytic agent, and condensing the vapors.

7. The herein described process for the treatment of residual oil in a "cracking" still, which consists in spraying into said residuum through a submerged catalytic spray a super-heated vapor at a temperature in excess of 1000° F.

8. The herein described process for the treatment of residual oil in a "cracking" still, which consists in spraying into said residuum through a submerged catalytic spray a superheated vapor at a temperature in excess of 1000° F., and in the presence of superheated steam sprayed above the bath of oil.

9. The improvement in treating the residual fractions of kerosene and other like partially refined hydro-carbon oils so as to utilize all the residue fractions and convert same into a commercial gasolene, which consists in subjecting the oil residue fractions to a temperature in excess of the distillation point and maintaining a pressure in excess of seven atmospheres per square inch on the vapor of said residue, then subjecting the residue oil to a treatment of gasolene 69 Bé. in the form of vapor superheated in excess of 1000° F. and in proportion according to the gravity of the residue, the said vapor being introduced through a perforated catalytic spray submerged in a bath of oil residue, then subject the vapor arising from said residue to a treatment of superheated steam in excess of 1100° F., and then condensing said vapor from the resultant oil product.

10. The process of treating kerosene oil by the application of heat and pressure sufficient to decompose all the components of said oil, which comprises the step of treating said oil with gasolene 64 Bé. to 68 Bé., in the form of vapor at a temperature of 1100° F. produced from the original oil and in volume equal to fifty per cent. of the kerosene, then forcing the kerosene oil thus prepared through a perforated copper pipe with fine closely associated perforations submerged in a bath of said kerosene oil having a temperature of 500° F. to 700° F., and under a pressure of 100 pounds to the square inch in the presence of superheated steam at a temperature of 1100° F., then releasing the vapor thereby produced from under pressure and condensing the said vapor, then purifying and filtering the ultimate product.

In testimony whereof I affix my signature.

JOSEPH WILSON TROTTER.

Witness:
   Nomie Welsh.